United States Patent
Rosemeier et al.

(10) Patent No.: US 7,500,931 B2
(45) Date of Patent: Mar. 10, 2009

(54) ALL-WHEEL DRIVE VEHICLE

(75) Inventors: Thomas Rosemeier, Meckenbeuren (DE); Ulrich Mair, Friedrichshafen (DE); Detlef Baasch, Ailingen (DE); Christoph Pelchen, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 389 days.

(21) Appl. No.: 11/581,902

(22) Filed: Oct. 17, 2006

(65) Prior Publication Data

US 2007/0087885 A1 Apr. 19, 2007

(30) Foreign Application Priority Data

Oct. 18, 2005 (DE) .................. 10 2005 049 709

(51) Int. Cl.
*F16H 3/72* (2006.01)

(52) U.S. Cl. ............................ 475/5; 477/3

(58) Field of Classification Search ............ 475/5; 477/3; 180/248

See application file for complete search history.

(56) References Cited

U.S. PATENT DOCUMENTS

| | | | |
|---|---|---|---|
| 4,976,347 A | 12/1990 | Sakakibara et al. | |
| 6,484,834 B2 * | 11/2002 | Bowen et al. | 180/65.6 |
| 6,579,201 B2 * | 6/2003 | Bowen | 475/5 |
| 6,604,591 B2 * | 8/2003 | Bowen et al. | 180/65.6 |
| 7,311,631 B2 * | 12/2007 | Kushino | 475/221 |

FOREIGN PATENT DOCUMENTS

| | | |
|---|---|---|
| DE | 40 24 063 A1 | 1/1992 |
| DE | 102 49 557 A1 | 5/2004 |
| DE | 103 48 960 A1 | 5/2005 |
| EP | 0 413 436 A1 | 2/1991 |
| JP | 11099838 A * | 4/1999 |
| JP | 2001-039179 A | 2/2001 |

* cited by examiner

*Primary Examiner*—Ha D. Ho
(74) *Attorney, Agent, or Firm*—Daivs & Bujold, P.L.L.C.

(57) ABSTRACT

A vehicle with a drive engine, with at least two vehicle axles and a transmission unit for variable distribution of drive torque from the drive engine in the vehicle's longitudinal direction between the vehicle's axles. The transmission unit is made with an input shaft and at least two output shafts, at least two planetary gearsets and an electric machine arranged between two mutually connected shafts of the planetary gearsets for distribution of the torque delivered via the transmission input shaft between the transmission output shafts as a function of a torque produced by the electric machine. The electric machine is in active connection with the transmission unit connecting between the two interconnected shafts of the planetary gearsets and the planetary gearsets are made with different transmission ratios so that the electric machine is driven by virtue of a speed difference between the actively interconnected shafts of the planetary gearsets.

7 Claims, 4 Drawing Sheets

ALL-WHEEL DRIVE VEHICLE

This application claims priority from German Application Serial No. 10 2005 049 709.8 filed Oct. 18, 2005.

FIELD OF THE INVENTION

The invention concerns an all-wheel drive vehicle with a drive engine, two vehicle axles and a transmission unit for the variable distribution of the drive torque from the drive engine in the longitudinal direction of the vehicle between the vehicle axles.

BACKGROUND OF THE INVENTION

From DE 103 48 960 A1, a transmission unit is known for distributing a drive torque from a transmission input shaft between two transmission output shafts, the transmission comprising at least two, at least three-shaft planetary gearsets. One respective shaft of one planetary gearset is connected with the transmission input shaft. In addition, one respective shaft of one planetary gearset constitutes one of the transmission output shafts and, respectively, at least one other shaft of each planetary gearset is in active connection with a shaft of the other planetary gearset. An operating-condition-dependent torque from one shaft of a planetary gearset can be supported via the active connection, depending on an operating condition of the respective other shaft of the other planetary gearset in active connection with it, in such manner that if a rotation speed difference occurs between the transmission output shafts, a torque that changes rotation speed difference is applied to the planetary gearset via the said active connection.

In addition, in the area of the active connection between the mutually connected shafts of the planetary gearsets an electric machine is provided, whose torque, produced in motor or generator operating mode, can be transmitted to the shafts of the planetary gearsets in such manner that a drive torque from a drive engine of a drive train of an all-wheel drive vehicle applied to the transmission can be distributed, according to need and in relation to the operating situation, in the vehicle's longitudinal direction between two vehicle axles or in the area of one vehicle axis in the direction transverse to the vehicle between two wheels, with a variable degree of distribution. In addition, the known transmission unit allows the possibility, in a front-wheel drive or rear-wheel drive vehicle, of distributing a drive torque from a drive engine in the area of a vehicle axis in the transverse vehicle direction between the wheels of the vehicle axis, with a variable degree of distribution.

The use of the transmission unit described above and known from the prior art in vehicles comprising a generator to charge the vehicle's batteries, leads to an increase in the total weight of the vehicle and in its manufacturing costs because of the incorporation of two electric machines in the vehicle, by comparison with vehicles respectively made with conventional distributor transmission without a variable degree of distribution.

Accordingly, the purpose of the present invention is to provide an all-wheel drive vehicle whose vehicle weight is lower compared with vehicles known from the prior art and which, besides, can be manufactured more cheaply.

SUMMARY OF THE INVENTION

The all-wheel drive vehicle, according to the invention, is constructed with a drive engine, at least two vehicle axles, and a transmission unit for the variable distribution of a drive torque from the drive engine, in the vehicle's longitudinal direction between the vehicle's axles. The transmission unit is constructed with a transmission input shaft and at least two transmission output shafts, with two planetary gearsets and with an electric machine arranged between two mutually connected shafts of the planetary gearsets for the variable distribution of the torque coming from the transmission input shaft between the two transmission output shafts as a function of a torque produced by the electric machine.

According to the invention, the electric machine is in active connection with the transmission unit in the area of the connection between the two mutually connected shafts of the planetary gearsets, and the planetary gearsets are made with different transmission ratios so that the electric machine can be driven during a direct start-off by virtue of a speed difference between the shafts of the planetary gearsets actively connected to one another, so that preferably an electrical storage medium of the vehicle can be charged by this operation of the electric machine in generator mode. In addition, the electrical energy produced by the electric machine can also be fed directly into the vehicle's electric circuitry in order to be able to supply electricity consumers.

Owing to the design of the two planetary gearsets of the transmission unit, according to the invention, almost over the entire operating range of the vehicle there will be a speed difference between the two shafts of the planetary gearsets actively connected with one another, which can be used to drive the electric machine operated in generator mode and thereby preferably to charge the electric storage medium or vehicle battery of the all-wheel drive vehicle.

Thus, in a simple manner an electric machine or generator provided in conventionally built vehicles can be replaced by the electric machine provided for the variable distribution of the degree of distribution of a torque supplied to the transmission unit from a transmission input shaft, whereby both the total weight of the vehicle and its manufacturing cost can be reduced by simple means.

BRIEF DESCRIPTION OF THE DRAWINGS

The invention will now be described, by way of example, with reference to the accompanying drawings. For the sake of better clarity, in the description of the various example embodiments the same indexes are used for components with the same structure and function. The drawings show.

DETAILED DESCRIPTION OF THE INVENTION

Figure 1:
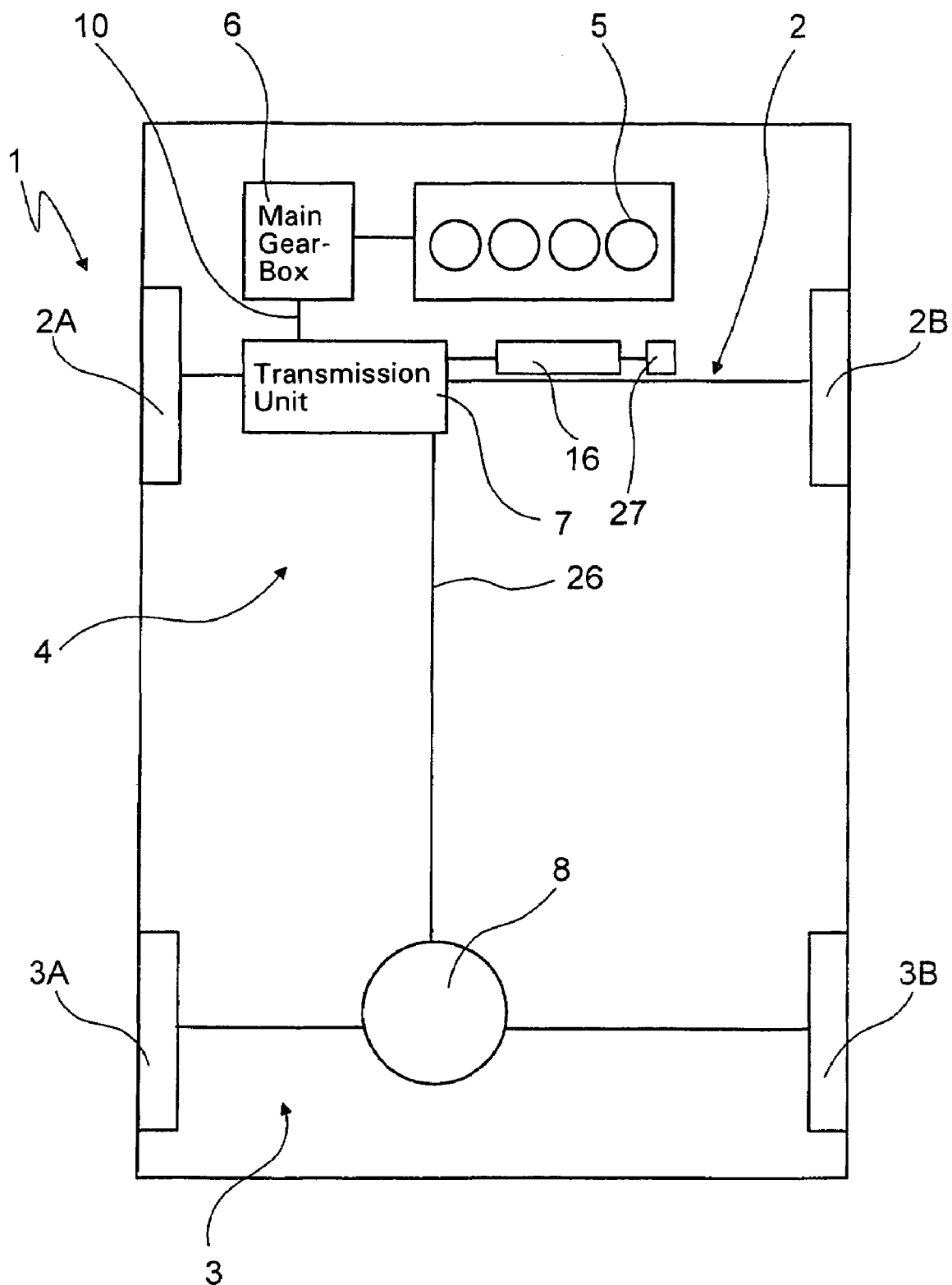
FIG. 1 is a schematic representation of a drive train of an all-wheel-drive vehicle with its drive engine arranged transversely to the vehicle.

FIG. 1 is a schematic representation of an all-wheel drive vehicle 1 with two vehicle axles 2, 3 which are part of a drive train 4 of the all-wheel drive vehicle 1. In addition, the drive train 4 comprises a drive engine or internal combustion engine 5 whose crankshaft (not shown in greater detail) is arranged extending transversely to the vehicle. Furthermore, the drive train 4 is made with a main gearbox 6, which can be any gearbox known in practice and is provided to enable the engagement of various stepped and/or continuously adjustable transmission ratios.

Between the main gearbox 6 and the vehicle axles 2, 3 of the all-wheel drive vehicle 1 which, in a known way, are connected on each side of the vehicle with at least one drive wheel 2A, 2B and 3A, 3B. There is provided a transmission unit 7 made as an overlap transmission with which the drive torque of the drive engine 5 or the transmission output torque of the main gearbox 6 can be distributed with a variable degree of distribution in the longitudinal direction of the vehicle between the two vehicle axles 2 and 3.

In addition, besides the longitudinal distribution provided for, of the transmission output torque from the main gearbox 6 in the area of the vehicle axle 2, the part of the transmission output torque allocated to the vehicle axle 2 is distributed in the direction transverse to the vehicle, in equal measure between the two wheels 2A and 2B of the axle 2, by way of an axle differential (not illustrated in greater detail and known in itself).

The fraction of the transmission output torque from the main gearbox 6 delivered to the vehicle axle 3 via a longitudinal vehicle shaft 26 that extends between the transmission unit 7 and the vehicle axle 3, is distributed by a device 8 provided in the area of the vehicle axle 3 in order to equalize speed differences between the wheels 3A and 3B on the vehicle axle 3. In this case the device 8 is made as a transverse transfer box or axle transmission, by which the drive torque applied to the axle 3 is distributed in the transverse direction of the vehicle between the two wheels 3A and 3B, essentially in equal parts.

Like the axle differential of the vehicle axle 2, the device 8 is made as a transverse transfer box or axle transmission known in itself, which makes it possible to drive the drive wheels 3A and 3B on the vehicle axle 3 at different speeds independently of one another, as appropriate for the different path lengths of the left or right drive tracks, whereby the drive torque can be distributed symmetrically and therefore without any yaw torque to the two drive wheels 3A and 3B on the vehicle axle 3.

Figure 2:
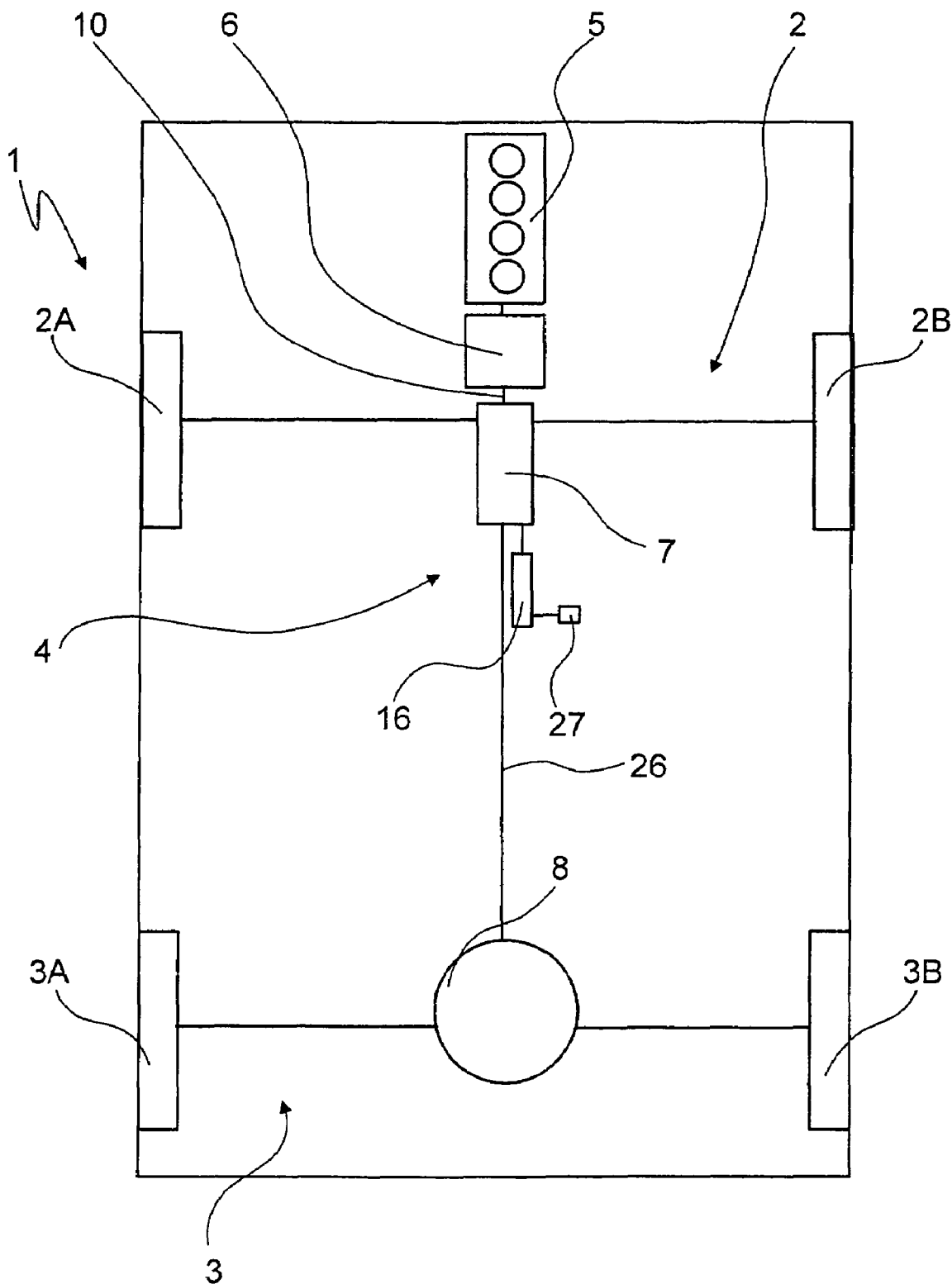
FIG. 2 is a schematic representation of a second example embodiment of an all-wheel drive vehicle with its drive engine arranged longitudinally in the vehicle.

FIG. 2 shows another example embodiment of an all-wheel drive vehicle 1 represented very schematically, in which the interval combustion engine 5 or its crankshaft (not shown in greater detail) is arranged along the longitudinal direction of the vehicle. In this example embodiment too, the transmission output torque of the main gearbox is distributed with a variable degree of distribution between the two vehicle axles 2 and 3 by way of the transmission unit 7, and the respective fractions of the transmission output torque from the main gearbox 6 delivered to the vehicle axles 2 and 3 are distributed by so-termed axle differentials known in themselves, in the direction transverse to the vehicle and in equal parts, respectively, between the wheels 2A and 2B of vehicle axle 2 and the wheels 3A and 3B of vehicle axle 3.

Figure 3:
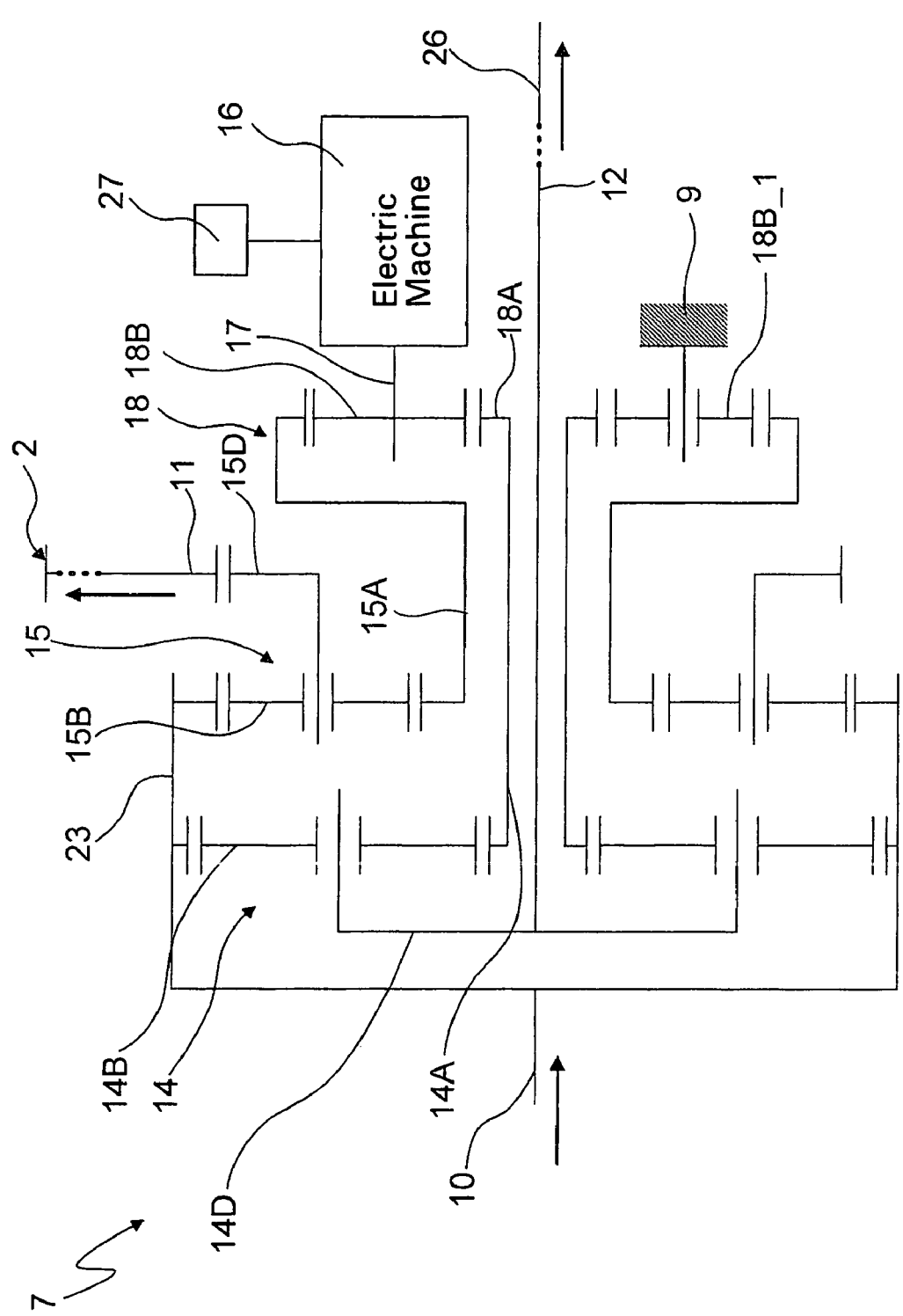
FIG. 3 is a gearing layout of the transmission unit of the all-wheel drive vehicle in FIG. 1.

FIG. 3 shows a gearing layout of the transmission unit 7 of the drive train according to FIG. 1, in which a drive torque from the drive engine 5 or a transmission output torque from the main gearbox 6 is delivered to the transmission unit 7 via the transmission input shaft 10.

The transmission unit 7 is built with two planetary gearsets 14 and 15 and with a device 16 arranged between two actively interconnected shafts 14A and 14B of the two planetary gearsets 14 and 15, for the variable distribution of the torque delivered via the transmission input shaft 10 between a first transmission output shaft 11 and a second transmission output shaft 12. In addition, annular gears of the planetary gearsets are connected to the transmission input shaft 10, which are made integrally and represented as a common annular gear 23.

The transmission output shafts 11 and 12 are in rotationally fixed connection at one of their ends with webs 14D and 15D, and at their ends remote from the webs 14D and 15D they are respectively in active connection with the axle differential of the vehicle axle 2, and via a longitudinal vehicle shaft 26 with the device 8 of the vehicle axle 3. The shafts 14A and 15A of the two planetary gearsets 14 and 15, in this case made as solar gears and actively connected to one another, are in each case connected with gear wheels 18A and 18C of a third planetary gearset 18.

In the present case the device 16 for the variable distribution of the torque delivered by the transmission input shaft 10 is made as an electric motor connected via its motor output shaft 17 to a satellite gear 18B of the third planetary gearset 18. The third planetary gearset 18 is in fixed connection via its satellite gear 18A with the satellite gear 14A of the first planetary gearset 14 and via its annular gear 18C with a satellite gear 15A of the second planetary gearset 15. A further satellite gear 18B_1 of the third planetary gearset 18 is mounted to rotate on a housing 9 of the transmission unit 7.

With this design of the transmission unit 7, in the area between the two solar gears 14A and 15A of the planetary gearsets 14 and 15, a torque produced by the device 16 can be introduced into the force flow between the two planetary gearsets 14 and 15 made with different transmission ratios, and a basic degree of distribution predefined by the design characteristics of the transmission unit 7 can be varied continuously between a lower limit value and an upper limit value as a function of the torque produced by the device 16.

By virtue of the planetary gearsets 14 and 15 made with different transmission ratios, during a direct start of the vehicle 1, there is a rotation speed difference between the solar gears 14A and 15A of the planetary gearsets 14 and 15, which is available in the area of the third planetary gearset 18 for driving the electric machine 16. Thus, in a simple manner it is possible during operation of the electric machine 16 in the generator mode, to charge an electricity storage medium or vehicle battery of the vehicle with the electrical energy produced by the electric machine 16 and/or to supply an electrical system of the vehicle with electrical energy.

In addition, the design of the transmission unit 7, shown in FIG. 3, makes it possible to vary the degree of distribution between the two transmission output shafts 11 and 12 over wide operating ranges of the drive train by way of a torque produced during operation of the electric machine 16 in the generator mode, so that the electric machine 16 need only be operated as a motor in exceptional cases.

The transmission unit 7 made as an overlap transmission in accordance with FIG. 3 essentially fulfills the same functions as a conventional longitudinal transfer box, by way of which the drive torque is distributed between the two vehicle axles 2 and 3 with a predefined degree of distribution. In addition, the degree of distribution can in a simple way be varied and adapted to measure nominal parameters by varying the torque that can be applied by the electric machine 16 as a function of the current driving situation and other condition parameters such as a yaw torque and/or a road condition.

Figure 4:
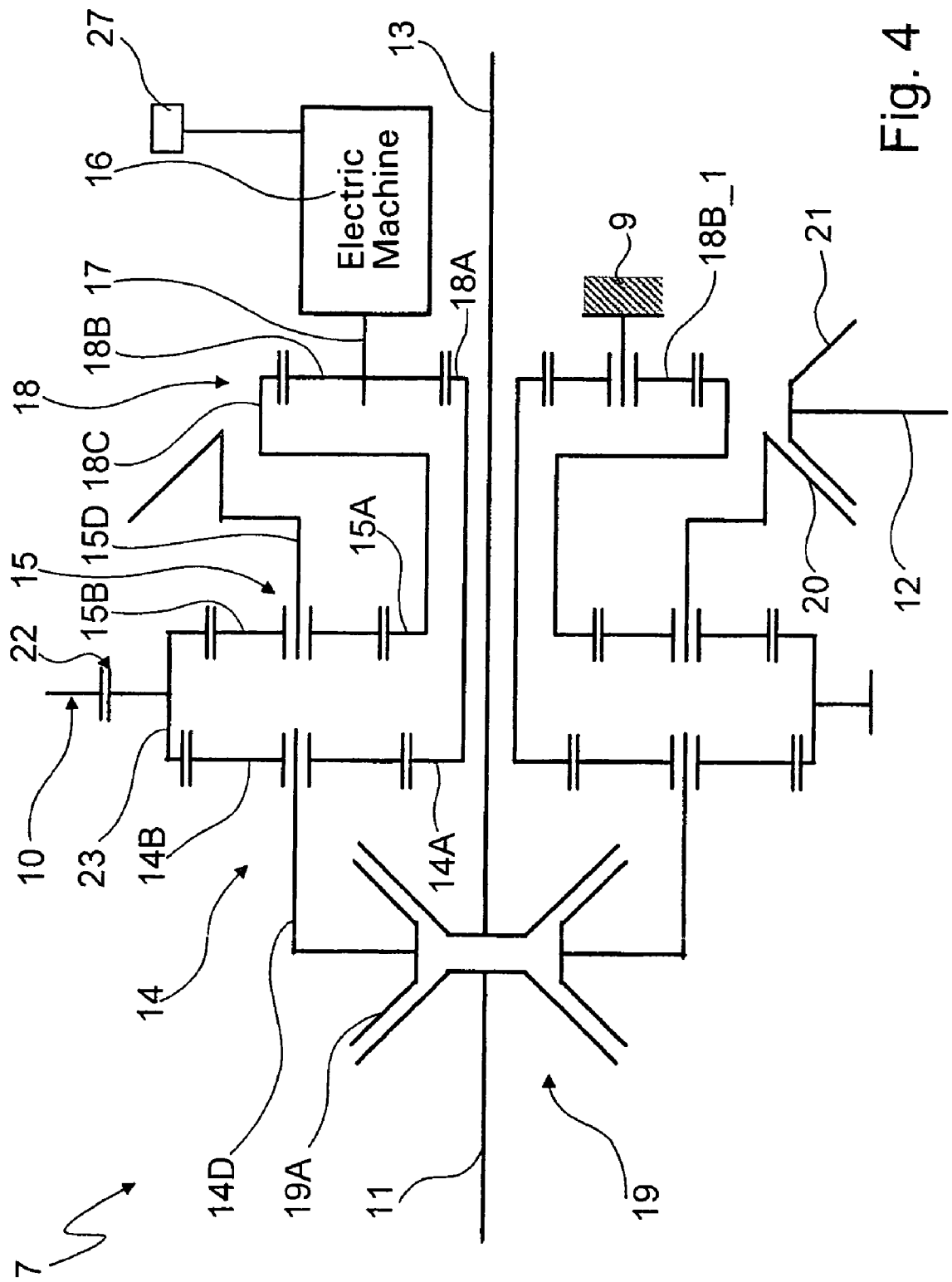
FIG. 4 is a gearing layout of the transmission unit of the all-wheel-drive vehicle in FIG. 2.

FIG. 4 shows a gearing layout for the transmission unit 7, represented schematically in FIG. 2, with a housing 9, a transmission input shaft 10 and three transmission output shafts 11, 12 and 13, with two planetary gearsets 14 and 15 and with a device 16 arranged between two actively interconnected shafts 14A and 15A of the planetary gearsets 14 and 15 for the variable distribution of the torque delivered by the transmission input shaft 10 between the transmission output shafts 11 and 13 and the transmission output shaft 12.

In this case the transmission output shafts 11 and 13 are respectively in active connection with the wheels 2A and 2B of the vehicle axle 2, which in the present case constitutes the front axle of the vehicle. The second transmission output shaft 12 is actively connected via the longitudinal shaft 26 of the vehicle with the device 8 of the second vehicle axle 3, which in this case is the rear axle of the vehicle.

The device 16 for the variable distribution of the torque delivered by the transmission input shaft 10 is the same in the example embodiment of the transmission unit 7 represented in FIG. 4, as it is in the example embodiment of the transmission unit 7 shown in FIG. 3, and accordingly, concerning the design and mode of operation of the device 16, reference should be made to the description of FIG. 3 given above.

The web 14D of the first planetary gearset 14 is formed with a differential cage 19A of a differential 19 provided in order to distribute the fraction of the torque delivered by the transmission input shaft 10 which is delivered to the transmission output shaft 11 and the transmission output shaft 13 equally between these two transmission output shafts 11 and 13.

This means that the differential 19 has essentially the same function as the device 8 and, therefore, also makes it possible to drive the drive wheels 2A and 2B on the vehicle axle 2 independently of one another at different speeds in accordance with the different path lengths of the left and right tracks, whereby the drive torque can be distributed symmetrically and thus with no yaw torque between the two drive wheels 2A and 2B on the vehicle axle 2.

A web 15D of the second planetary gearset 15 is formed with a bevel gear 20, which meshes with another bevel gear 21 connected to the second transmission output shaft 12.

The transmission output torque from the main gearbox 6 delivered by the transmission input shaft 10 is transmitted via a spur gear 22 to the common annular gear 23 of the first planetary gearset 14 and the second planetary gearset 15. From there, the transmission output torque from the main gearbox 6 is transmitted to satellite gears 14B and 15B engaged with the annular gear 23. These are respectively mounted to rotate on the webs 14D and 15D of the planetary gearsets 14 and 15 and driving the two webs 14D and 15D by virtue of their rolling movement in the annular gear 23.

The two webs 14D and 15D of the planetary gearsets 14 and 15 are, in turn, connected to the transmission output shafts 11, 12 and 13 respectively, so that the transmission output torque from the main gearbox 6 passing via the spur gear 22, the annular gear 23, the satellite gears 14B and 15B and the webs 14D and 15D, is delivered to the transmission output shafts 11 to 13 with degrees of distribution regulated by the electric motor 16.

As with the transmission unit 7 in FIG. 3, the transmission output torque from the main gearbox 6 delivered via the transmission input shaft 10 to the transmission unit 7 is distributed, as a function of a basic distribution of the transmission unit 7 predefined by design, between the second transmission output shaft 12 and the two output shafts 11 and 13. The basic degree of distribution of the transmission unit 7 is determined by the ratio of the different transmission ratios of the two planetary gearsets 14 and 15 and by the ratio of the number of teeth on the annular gear 18C to the number of teeth on the solar gear 18A of the third planetary gearset 18. This basic degree of distribution is changed as a function of the torque brought to bear by the electric machine 16 preferably operating in generator mode, being shifted respectively in the direction of an upper or a lower limit value of the degree of distribution.

The combination of the web 14D of the first planetary gearset 14 with the differential cage 19A of the differential 19 is a very space-saving solution for the transmission unit 7, because the differential 19 essentially constituting a conventional axle differential can be integrated quite simply in the housing 9 of the transmission unit 7 and can, therefore, be made without a housing of its own. In addition, the third transmission output shaft 13, which extends in the direction transverse to the vehicle, can simply pass centrally through the solar gears 14A, 15A and 18A of the three planetary gearsets 14, 15 and 18, in this case made as hollow shafts, which is not possible with conventional front-transverse or rear-transverse driven all-wheel vehicles, since the axle and overlap transmission usually made as separate structural groups cannot be positioned relative to one another in the necessary manner during assembly, or only so by virtue of cost-intensive measures.

REFERENCE NUMERALS

1 all-wheel vehicle
2 vehicle axle
2A, 2B drive wheels
3 vehicle axle
3A, 3B drive wheels
4 drive train
5 drive engine, internal combustion engine
6 main gearbox
7 transmission unit
8 device
9 housing of the transmission unit
10 transmission input shaft
11 first transmission output shaft
12 second transmission output shaft
13 third transmission output shaft
14 first planetary gearset
14A solar gear
14B satellite gear
14D web
15 second planetary gearset
15A solar gear
15B satellite gear
15D web
16 device, electric machine
17 motor output shaft
18 third planetary gearset
18A solar gear
18B satellite gear
18B_1 satellite gear
18c annular gear
19 differential
19A differential cage
20 bevel gear
21 other bevel gear
22 spur gear
23 annular gear
26 longitudinal vehicle shaft
27 electricity storage medium

The invention claimed is:

1. An all-wheel drive vehicle (1) having
a drive engine (5),
at least two vehicle axles (2, 3), and
a transmission unit (7) for variable distribution of drive torque from the drive engine (5), in a longitudinal direction of the vehicle, between the vehicle's axles (2, 3), the transmission unit (7) having a transmission input shaft (10) and at least two transmission output shafts (11, 12, 13), at least two planetary gearsets (14, 15, 18) and an electric machine (16) arranged between two mutually connected shafts (14A, 15A) of the planetary gearsets (14, 15) for the variable distribution of torque delivered by the transmission input shaft (10) between the at least two transmission output shafts (11, 12, 13) as a function of a torque produced by the electric machine (16), the electric machine (16) actively communicating with the transmission unit (7) in an area of a connection between the two mutually connected shafts (14A, 15A) of the planetary gearsets (14, 15), and the planetary gearsets (14, 15) having different transmission ratios such that, during a direct start, the electric machine (16) is driven by virtue of a speed difference between the two mutually connected shafts (14A, 15A) of the planetary gearsets (14, 15).

2. The all-wheel drive vehicle according to claim 1, wherein the drive engine (5) is aligned transverse to the longitudinal direction of the vehicle.

3. The all-wheel drive vehicle according to claim 1, wherein the drive engine (5) is aligned along the longitudinal direction of the vehicle.

4. The all-wheel drive vehicle according to claim 1, wherein the transmission unit (7) has three transmission output shafts (11, 12, 13).

5. The all-wheel drive vehicle according to claim 1, wherein a web (14D) of a first planetary gearset (14) is formed with a differential cage (19A) of a differential (19) which is provided to distribute a portion of the torque delivered by the transmission input shaft (10), via the transmission unit (7), to first and second of the at least two transmission output shafts (11, 12), between the first and second output shafts (11, 12).

6. The all-wheel drive vehicle according to claim 5, wherein a differential (19) is arranged in a housing (9) of the transmission unit (7).

7. The all-wheel-drive vehicle according to claim 4, wherein a web (15D) of a second planetary gearset (15) is formed with a bevel gear (20) which meshes with a bevel gear (21) of a third transmission output shaft (13).

* * * * *